(12) United States Patent
Bohan et al.

(10) Patent No.: US 12,018,613 B1
(45) Date of Patent: Jun. 25, 2024

(54) DISK ENGINE WITH CIRCUMFERENTIAL SWIRL RADIAL COMBUSTOR

(71) Applicant: Government of the United States, as represented by the Secretary of the Air Force, Wright-Patterson AFB, OH (US)

(72) Inventors: Brian Bohan, Dayton, OH (US); Marc Polanka, Huber Heights, OH (US); Bennett Staton, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/846,633

(22) Filed: Jun. 22, 2022

Related U.S. Application Data

(62) Division of application No. 16/866,700, filed on May 5, 2020, now Pat. No. 11,415,046.

(60) Provisional application No. 62/958,381, filed on Jan. 8, 2020, provisional application No. 62/856,801, filed on Jun. 4, 2019.

(51) Int. Cl.
*F02C 3/08* (2006.01)
*F02C 7/12* (2006.01)

(52) U.S. Cl.
CPC ............... *F02C 3/08* (2013.01); *F02C 3/085* (2013.01); *F02C 7/12* (2013.01)

(58) Field of Classification Search
CPC .... F02C 3/08; F02C 3/085; F02C 3/05; F02C 7/12; F02C 7/22; F02C 3/045; F05D 2220/32; F05D 2240/35; F05D 2260/201
See application file for complete search history.

(56) References Cited

U.S. PATENT DOCUMENTS

| | | | | |
|---|---|---|---|---|
| 2,460,523 A | * | 2/1949 | Olov | F02C 3/06 60/804 |
| 2,709,893 A | * | 6/1955 | Birmann | F02C 7/18 60/39.511 |
| 3,126,703 A | * | 3/1964 | Oprecht | F02C 7/00 60/804 |
| 3,172,260 A | * | 3/1965 | Chute | F02C 3/085 60/805 |
| 3,321,912 A | * | 5/1967 | Oprecht | F23R 3/38 60/726 |
| 4,151,709 A | * | 5/1979 | Melconian | F23R 3/52 60/804 |
| 4,845,941 A | * | 7/1989 | Paul | F02C 3/067 60/776 |
| 4,955,192 A | * | 9/1990 | Shekleton | F01D 21/045 60/804 |
| 5,161,945 A | * | 11/1992 | Clevenger | F01D 25/145 415/177 |

(Continued)

*Primary Examiner* — Ehud Gartenberg
*Assistant Examiner* — Henry Ng
(74) *Attorney, Agent, or Firm* — AFMCLO/JAZ; Matthew D. Fair

(57) ABSTRACT

A disk engine and system configured to provide high power at a reduced axial length is disclosed herein. The disk engine includes a radial compressor, a compressor discharge manifold positioned circumferentially about compressor, a combustion chamber positioned within the discharge manifold and a radial turbine positioned radially inward of the combustion chamber.

11 Claims, 11 Drawing Sheets

(56) References Cited

U.S. PATENT DOCUMENTS

| | | | | |
|---|---|---|---|---|
| 5,280,703 | A * | 1/1994 | Corrado | F02C 3/09 |
| | | | | 60/804 |
| 5,526,640 | A * | 6/1996 | Brooks | F23R 3/38 |
| | | | | 60/804 |
| 6,324,831 | B1 * | 12/2001 | Izadi | F01D 5/043 |
| | | | | 60/796 |
| 8,966,877 | B2 * | 3/2015 | McKinney | F23R 3/26 |
| | | | | 60/39.23 |
| 10,914,471 | B2 * | 2/2021 | Chon | F23R 3/26 |
| 2002/0012588 | A1 * | 1/2002 | Matsunaga | F02C 3/05 |
| | | | | 415/232 |
| 2010/0071377 | A1 * | 3/2010 | Fox | F23R 3/346 |
| | | | | 60/740 |
| 2010/0146987 | A1 * | 6/2010 | Isomura | F02C 7/08 |
| | | | | 60/806 |
| 2010/0218509 | A1 * | 9/2010 | Milner | F23R 3/60 |
| | | | | 60/806 |
| 2015/0247459 | A1 * | 9/2015 | Carrere | F02C 7/26 |
| | | | | 60/796 |
| 2019/0178159 | A1 * | 6/2019 | Shipachev | F02C 3/06 |

* cited by examiner

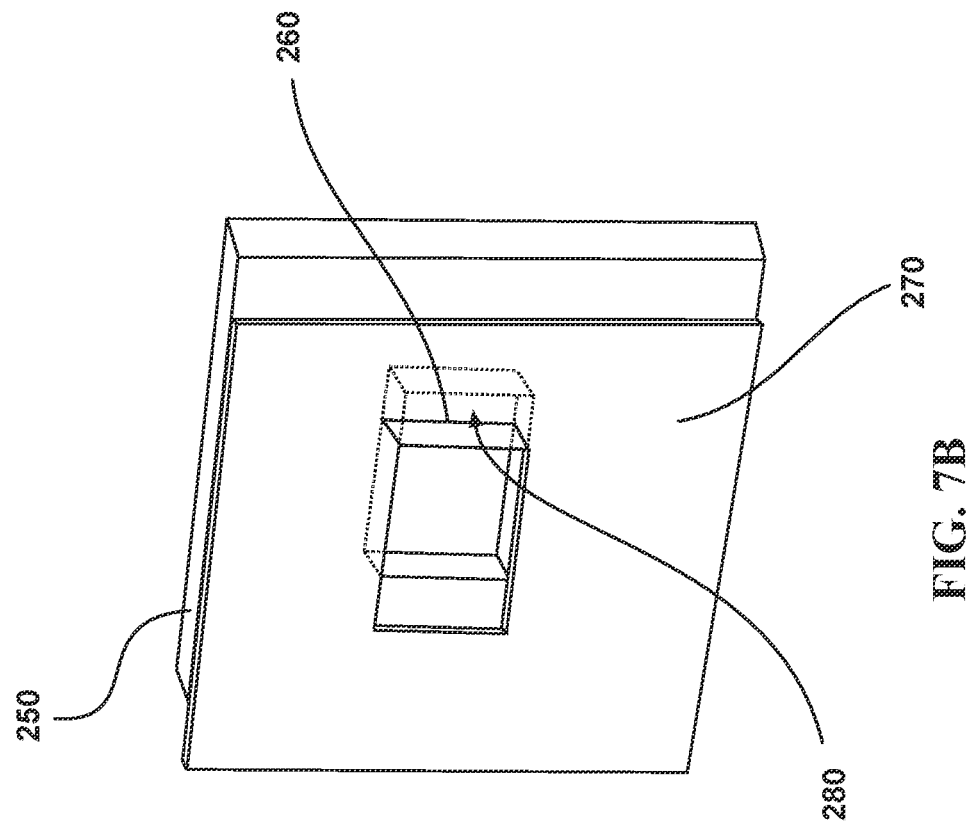
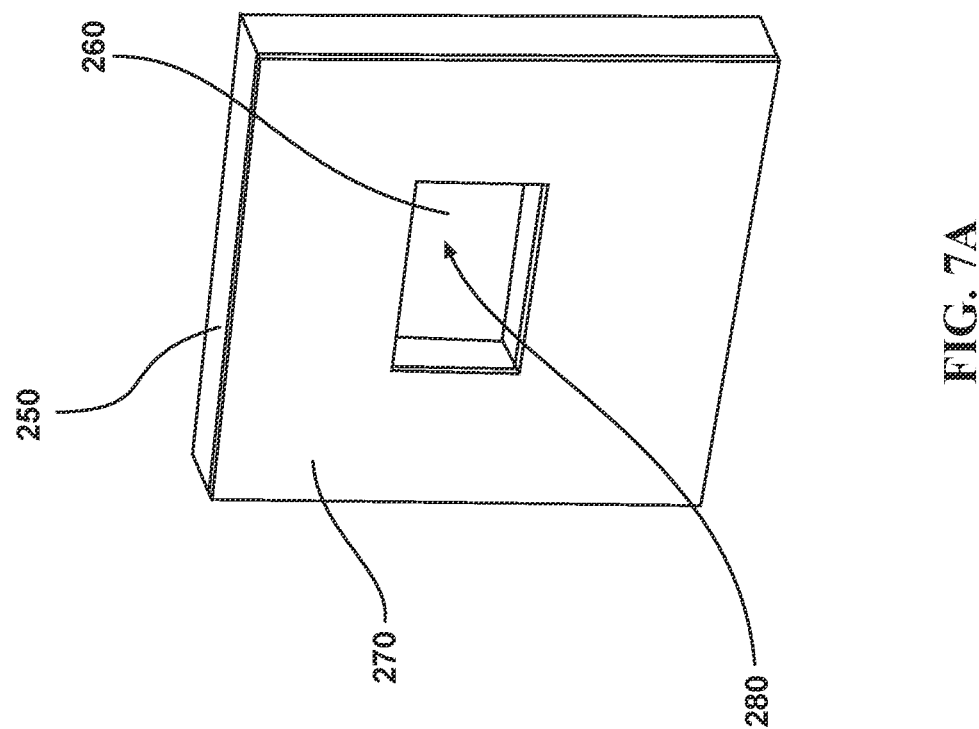
FIG. 7A
FIG. 7B

DISK ENGINE WITH CIRCUMFERENTIAL SWIRL RADIAL COMBUSTOR

Pursuant to 37 C.F.R. § 1.78(a)(4), this application is a Division of co-pending Non-Provisional application Ser. No. 16/866,700, filed May 5, 2020, which claims benefit of Provisional Application Ser. No. 62/958,381, filed Jan. 8, 2020 and of Provisional Application Ser. No. 62/856,801, filed Jun. 4, 2019, all of which are expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a disk engine and more particularly, but not exclusively to a disk engine with a radial combustor to define an axially compact power system.

BACKGROUND

Gas turbine engines are used to power aircraft, watercraft and land vehicles. While axial flow gas turbine engines are prevalent, some gas turbine engines have a radial flow compressor and a radial flow turbine which somewhat reduces the axial length of the engine. Some applications have requirements for an engine with an axial length that is smaller than prior art systems can provide. Accordingly, there remains a need for further contributions in this area of technology.

SUMMARY

One embodiment of the present disclosure includes a unique disk engine configured with a radial flow combustor to minimize axial space claim. Other embodiments include apparatuses, systems, devices, hardware, methods, and combinations wherein the disk engine includes a unique method and means for inducing circumferential combustor swirl to facilitate efficient combustion in a radial flow combustor. Further embodiments, forms, features, aspects, benefits, and advantages of the present application shall become apparent from the description and figures provided herewith.

BRIEF DESCRIPTION OF THE FIGURES

FIGS. 7A and 7B are schematic illustrations of a sliding tabbed plate for a variable area air inlet according to one illustrative embodiment;

DETAILED DESCRIPTION OF THE ILLUSTRATIVE EMBODIMENTS

Figures 1, 2:
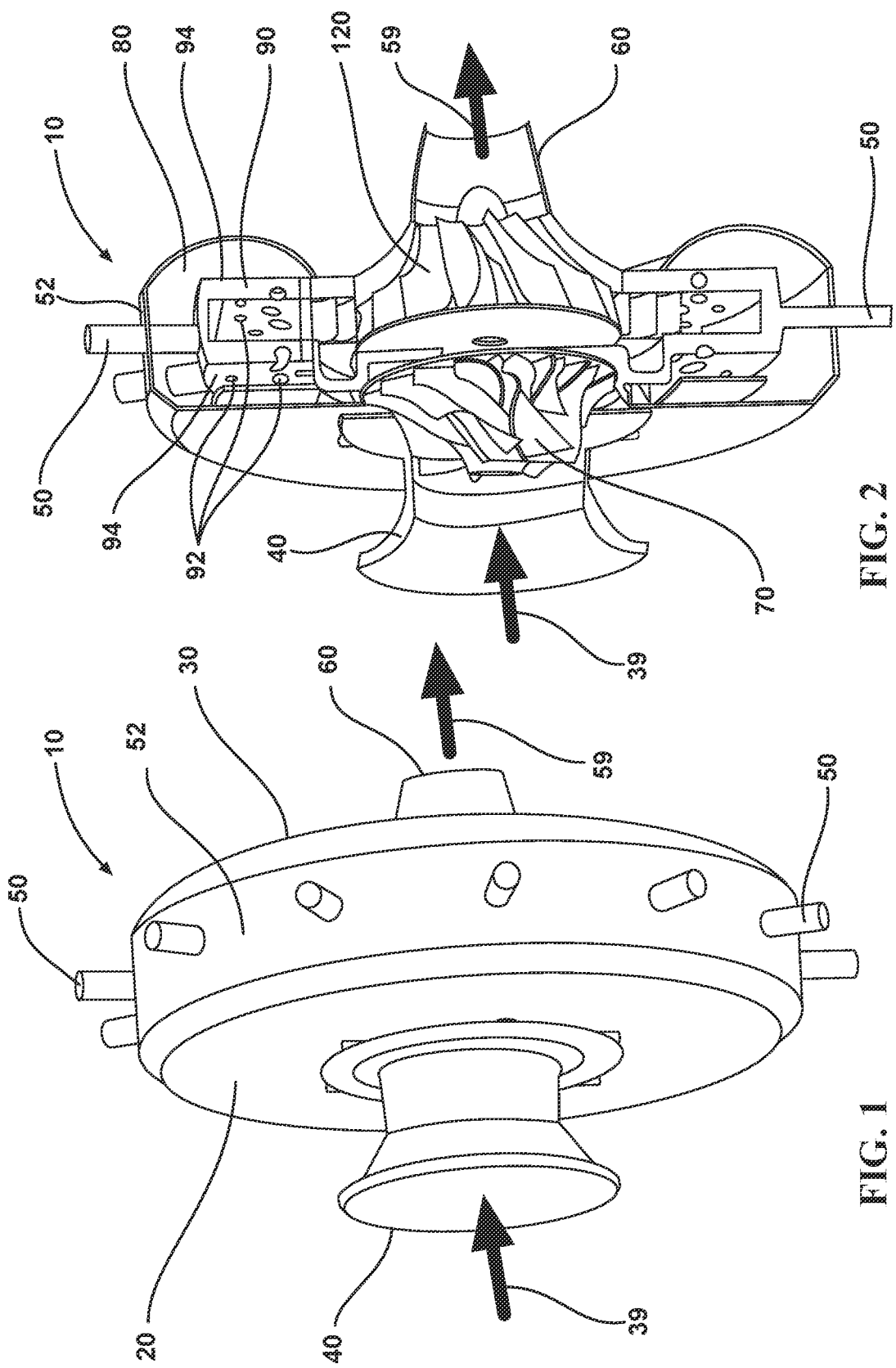
FIG. 1 is a perspective view of a disk engine according one embodiment of the present disclosure.
FIG. 2 is a cut-away sectional view of the disk engine of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The disk engine disclosed herein operates on a traditional Brayton cycle like other gas turbine engines, but the configuration is designed such that the axial length of the engine is significantly reduced over traditional engines. A circumferential swirl combustor positioned around the outside diameter of the engine is one feature that enables the compact engine architecture. The circumferential flow combustor enhances the mixing of combustion reactants and permits a reduction of the axial length of the combustor compared to other gas turbine engines. Swirling the reactants at a high centrifugal loading inside the combustion cavity has been shown to enhance Rayleigh-Taylor instabilities leading to enhanced mixing of the reactants. Greater mixing means that the reactions can happen faster in a smaller combustor volume. The outside diameter of the combustion cavity serves as the primary reaction zone, where the fuel is burned rich. The mixture moves radially inward, while simultaneously swirling circumferentially, where additional air is introduced and the remaining fuel is burned lean. This process follows the Rich Burn, Quick Quench, Lean Burn (RQL) cycle which is beneficial in reducing heat load to the engine hardware, and reducing NOx emissions.

The amount of centrifugal loading that can be applied to the reactants in the primary zone is limited to be able to sustain combustion. The target to achieve maximum mixing while ensuring combustion is sustained is approximately 2,500 g's (2,500 times the acceleration of gravity), with values above 3,500 g's often resulting in a flameout. The present design allows the fluid flow in the primary zone (cavity outer diameter) to be swirled in a helical pattern by using offset, horizontally opposed air injectors. The size of the air injector openings can be varied or adjusted in some embodiments so that the circumferential loading can be controlled at an optimum value across the entire engine operating range. The circumferential swirl of the combustion reactants (air and fuel) can be maintained throughout the entire combustor flowpath and continue directly into the radial turbine.

The length of an axial combustor in use in engines today is controlled by the amount of time it takes for the combustor to inject fuel and air, mix the fuel and air, and fully combust the fuel mixture prior to entering the turbine section. The method of injection and mixing in an axial combustor requires a relatively large minimum length to achieve these goals. The present invention provides a circumferential swirl to the combustor flow path so that the flow is redirected in the circumferential direction which in turn minimizes the axial length required to complete the combustion process prior to reaching the turbine inlet.

The combustion chamber is defined by a circumferential cavity with radial dilution inlet holes directing airflow into the chamber. The dilution inlet holes can be angled and horizontally opposed such that the fuel and air reactants inside are rotating at high centripetal acceleration in a spiral, cork-screw fashion. The inlet holes can include variable geometry features to limit the maximum circumferential acceleration in the cavity. The combustion chamber includes a primary combustion zone in the outer diameter region. A secondary combustion zone and dilution zone are located radially inward of the primary combustion zone. Additional variable geometry inlets can be used to control the air distribution throughout the combustion chamber. In the last stage of combustion proximate the dilution zone, the exhaust products are directed through a row of stator vanes to accelerate and direct the gases into a radial inflow turbine.

The combustion chamber of the disk engine as defined herein can achieve equal performance to a traditional gas turbine engine combustor, but with a significantly shorter axial length and corresponding weight reduction. Further reduction in axial length of the combustion chamber is achieved by positioning the turbine radially inward of the combustor. Additionally, this radial combustor design provides a relatively uniform temperature profile across the exit plane as combustion gases pass into the turbine rotor inlet. This is important, because if the temperature profile of the combustion products at the turbine rotor inlet includes hot spots or regions, the mechanical life and thermal efficiency of the turbine are reduced.

Referring now to FIG. 1, a perspective view of a disk engine 10 according to one illustrative embodiment is disclosed herein. The disk engine 10 includes a compressor side 20 and a turbine side 30. Air represented by arrow 39 enters the disk engine 10 through an inlet 40. A plurality of fuel inlet ports or injectors 50 are operably connected to the disk engine 10 through an outer circumferential perimeter wall 52. Fuel is combusted with the air and the resulting exhaust products represented by arrow 59 exits the disk engine 10 through the exhaust nozzle outlet 60.

Referring to FIG. 2, a cutaway view of the disk engine 10 is shown. A radial compressor 70 receives air from an inlet 40. The radial compressor 70 compresses the air and discharges the pressurized air into a circumferential manifold 80 extending around the disk engine 10 radially inward of the outer perimeter wall 52. A circumferential combustion chamber or combustor 90 is positioned within the manifold 80. The combustor 90 includes a plurality of inlet holes or apertures 92 to permit the pressurized air to transfer from the manifold into the combustor 90. The inlet apertures 92 can be offset from side to side of the combustor 90. Furthermore, the inlet apertures 92 can be angled relative to one another. The offset positions and angle variation provides a swirling motion within the combustor to promote mixing of the air and fuel to speed up the combustion event.

A radial turbine 120 receives high temperature pressurized combustion flow exiting the combustor 90, which drives the turbine at a high rotational speed. The rotational speed is dependent on physical size and operating conditions, but can range anywhere from a few thousand RPM to over one hundred thousand RPM. The turbine 120 drives the compressor 70 and can be connected to other shaft driven devices such as an electric power generator (not shown) or the like. The exhaust flow is accelerated through the exhaust nozzle 60 and can generate a thrust sufficient to power an aircraft or a missile.

Figure 3:
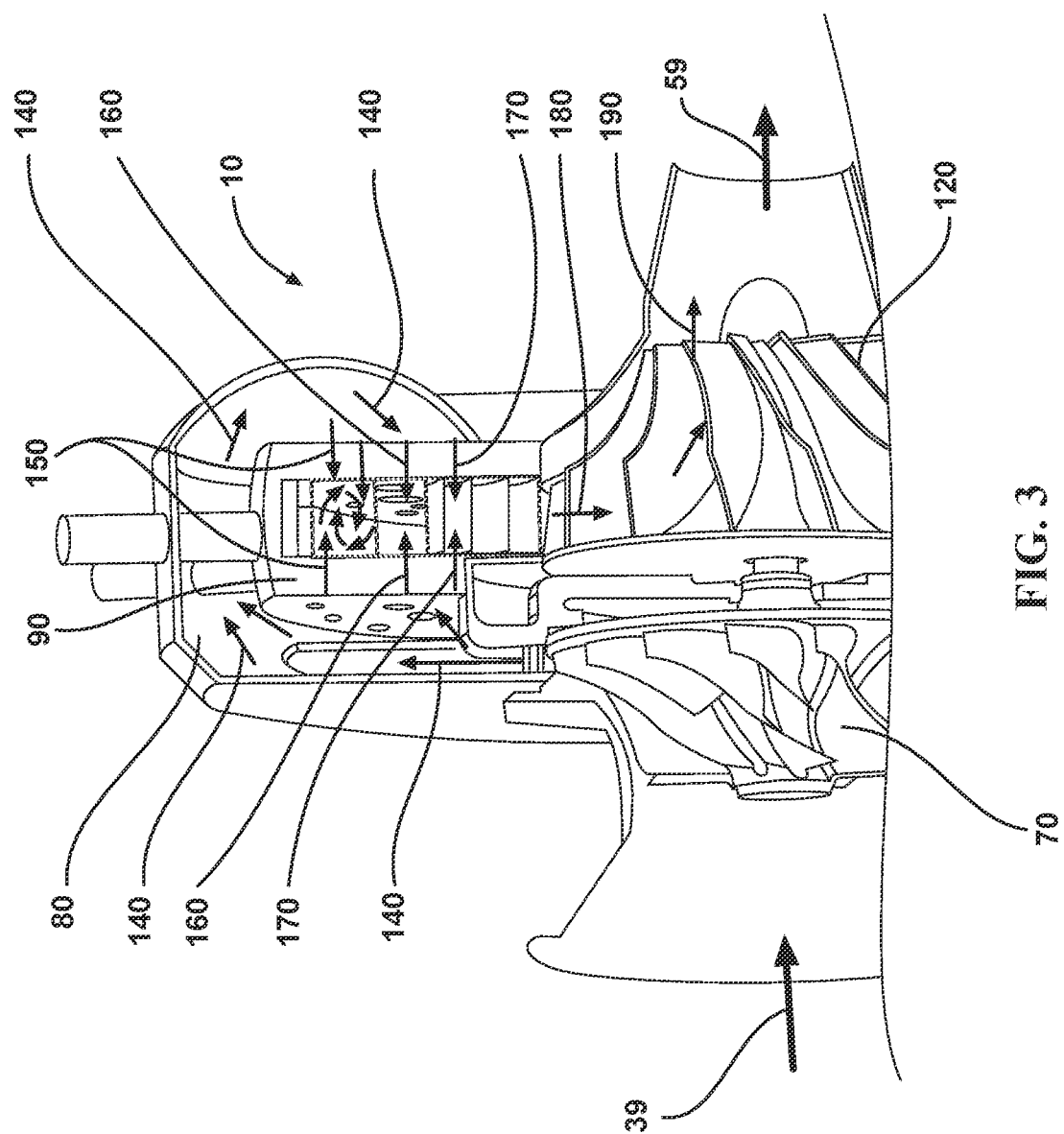
FIG. 3 is an enlarged view of a portion of FIG. 2 with arrows showing internal fluid flow paths.

Referring to FIG. 3, an enlarged view of a portion of the disk engine 10 depicts working fluid flow paths represented by arrows 140 through the engine. The compressor inlet airflow 39 enters the compressor 70 and is compressed to a design pressure. The compressed air 140 exits through the compressor outlet and is directed into the manifold 80. The compressed air then enters the combustor 90 at an outer primary combustion zone 150, at a secondary zone 160 radially inward of the primary zone and at a dilution zone 170 radially inward of the secondary zone 160. The airflow from each of the zones 150, 160 and 170 can be combusted with fuel or used to dilute and cool the combustion products or other hot regions of the engine 10. After exiting the combustor 90, the combustion product working fluid is directed to the turbine inlet 180. The working fluid provides energy to the turbine and exits as a turbine outlet flow 190 prior to discharging from the engine 10 as an exhaust outlet flow 59.

Figure 4:
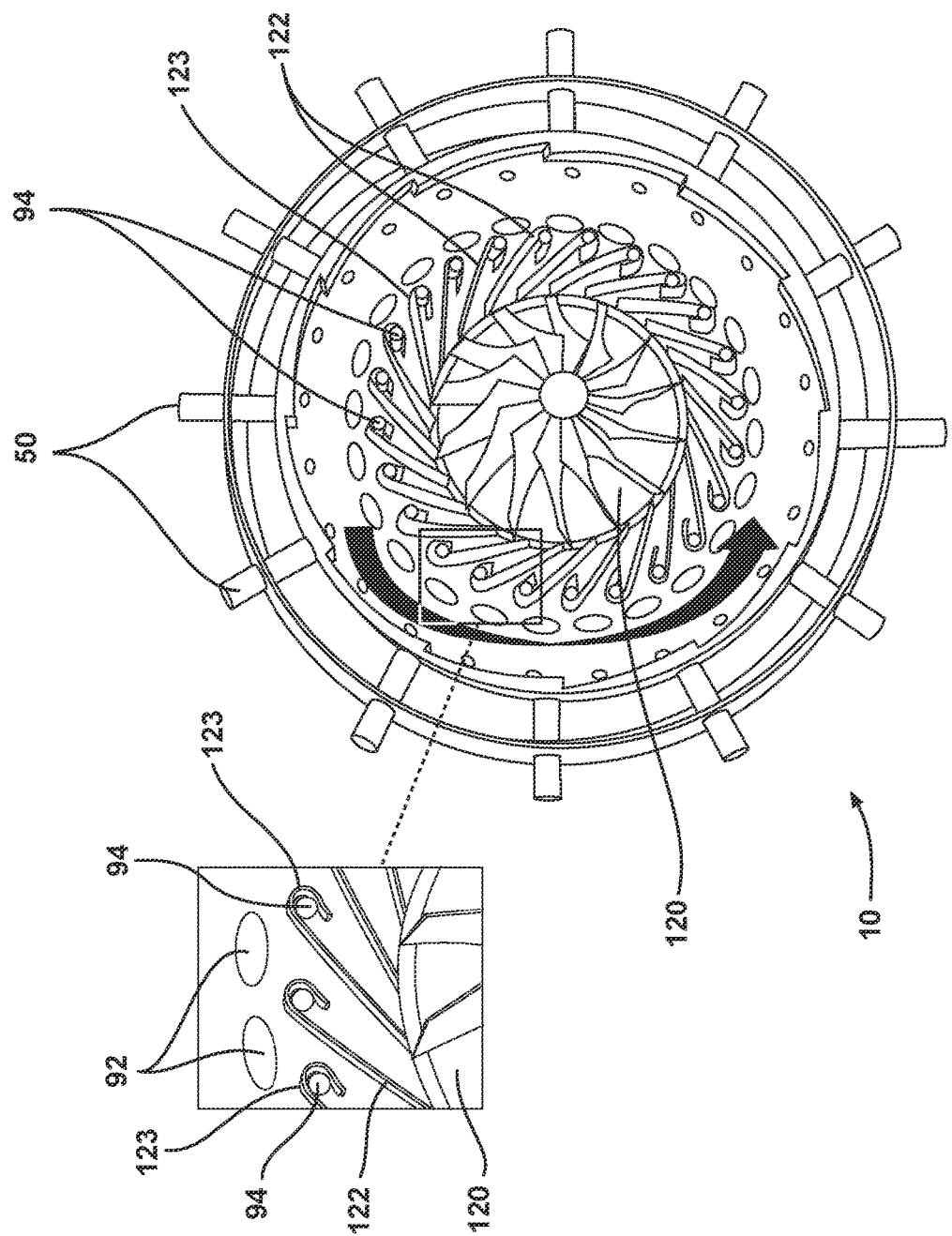
FIG. 4 is a side cut-away sectional view of the turbine side of the disk engine of FIG. 1.

Referring to FIG. 4, a side view of the engine 10 shows a plurality of dilution holes 94 positioned internal to each of a plurality of turbine inlet guide vanes or stators 122 positioned around the turbine 120. Each stator 122 include an upper hook portion 123 that wraps around a dilution hole 94 to provide some directional control of the airflow passing therethrough.

Figure 5:
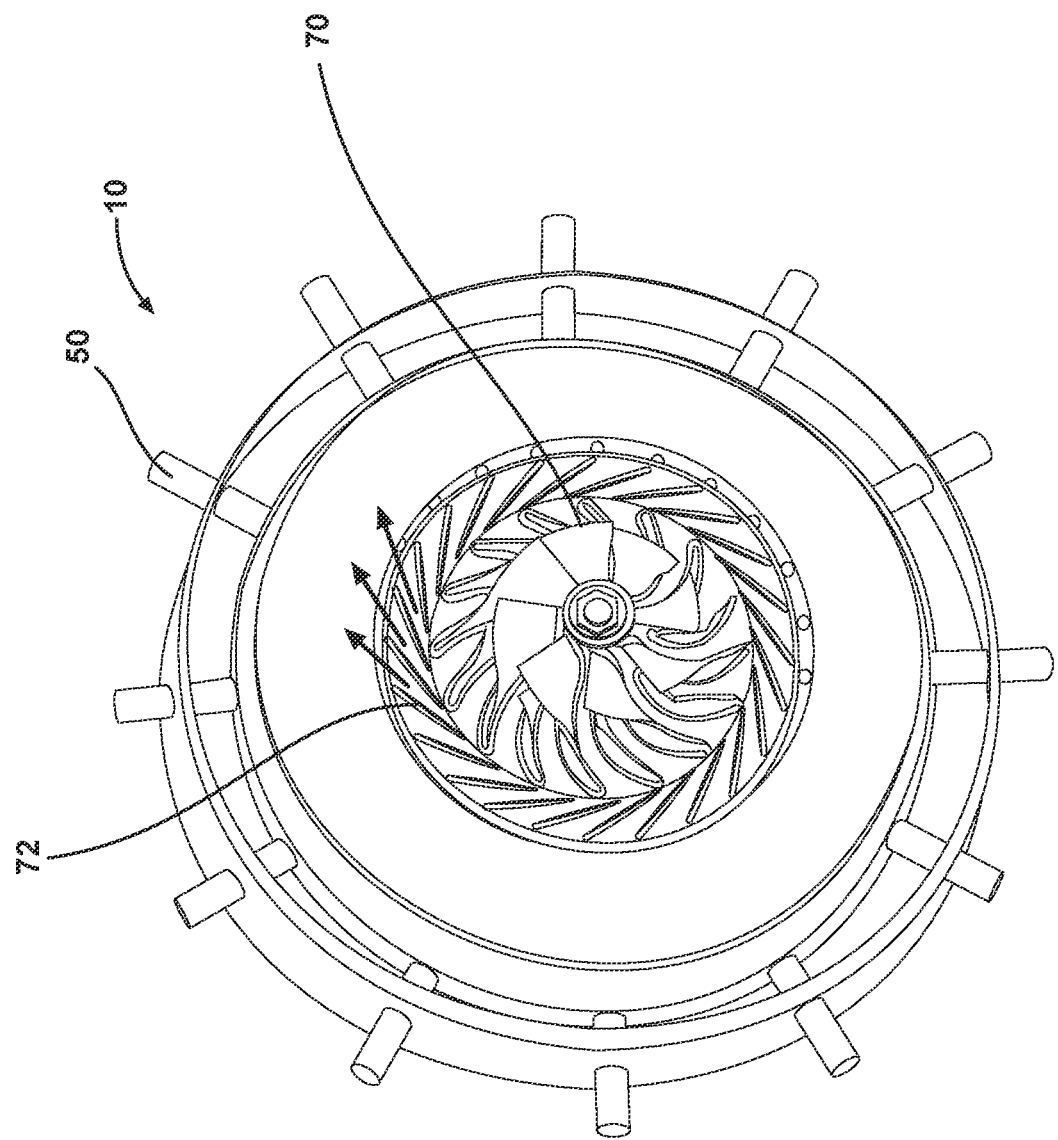
FIG. 5 is a side cut-away sectional view of the compressor side of the disk engine of FIG. 1.

Referring to FIG. 5, a cutaway side view of the engine 10 shows a plurality of compressor outlet guide vanes 72 positioned around the compressor 70. The arrows represent compressed airflow exiting through the outlet guide vanes 72 as is known to those skilled in the art.

Figure 6:
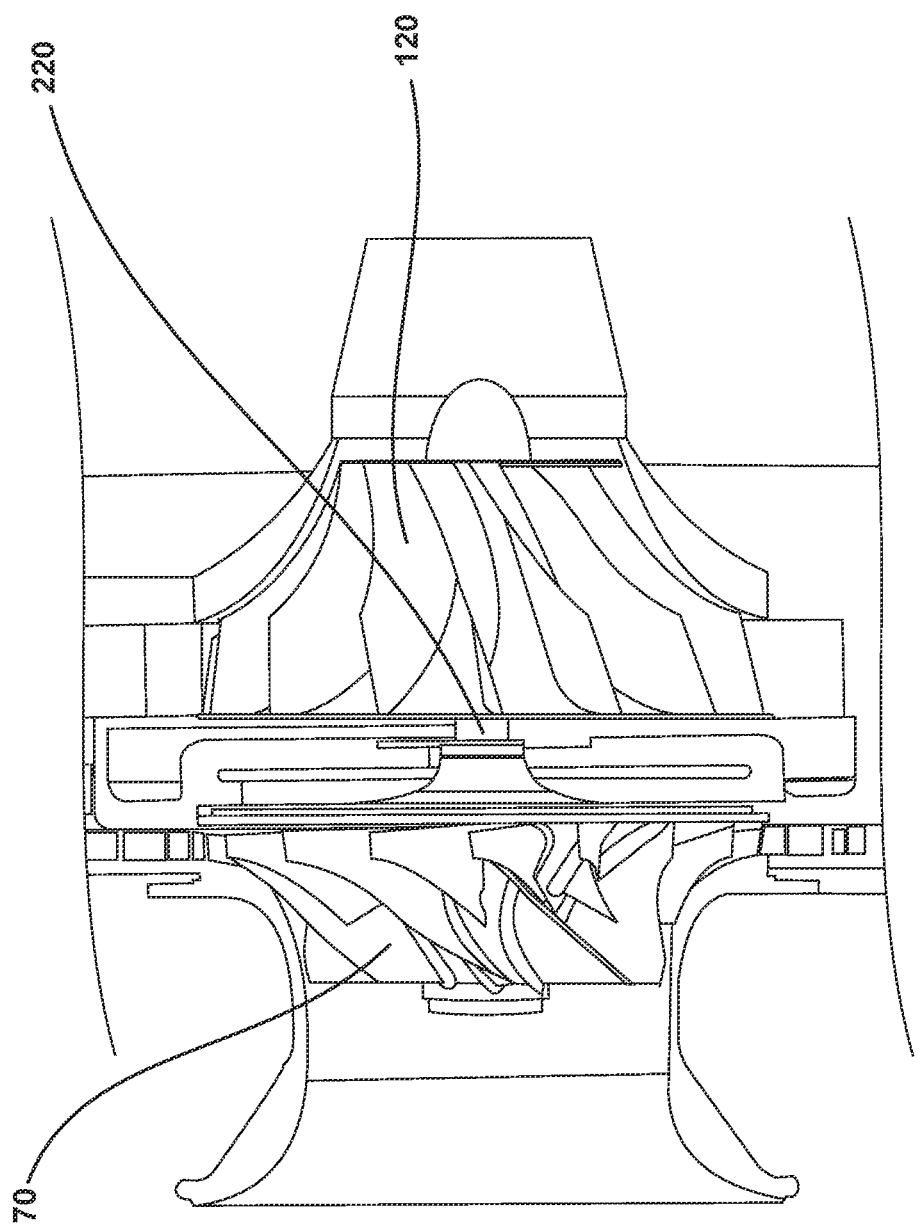
FIG. 6 is another cut-away view of the disk engine of FIG. 1 showing a bearing support structure.

Referring to FIG. 6, another side view of the engine 10 shows a bearing mechanism 220 structured to rotatably support the compressor 70 and the turbine 120 as they rotate at high speeds.

Referring to FIGS. 7A and 7B, a schematic illustration of a sliding tabbed plate for use as a variable area air inlet device is shown. A combustor wall 250 for a combustion chamber can include an aperture 260 to permit compressed air to flow therethrough. A sliding cover 270 can be moved relative to the aperture 260 from a completely open position to a closed position. The sliding cover can be moved via electric or mechanical actuation as would be known to those skilled in the art. FIG. 7A shows the variable area inlet 280 completely open and FIG. 7B shows the variable are inlet 280 partially closed with a sliding cover 270. In the disclosed embodiment, the aperture 200 is rectangular in shape, however other shapes are contemplated herein.

Figure 8B:
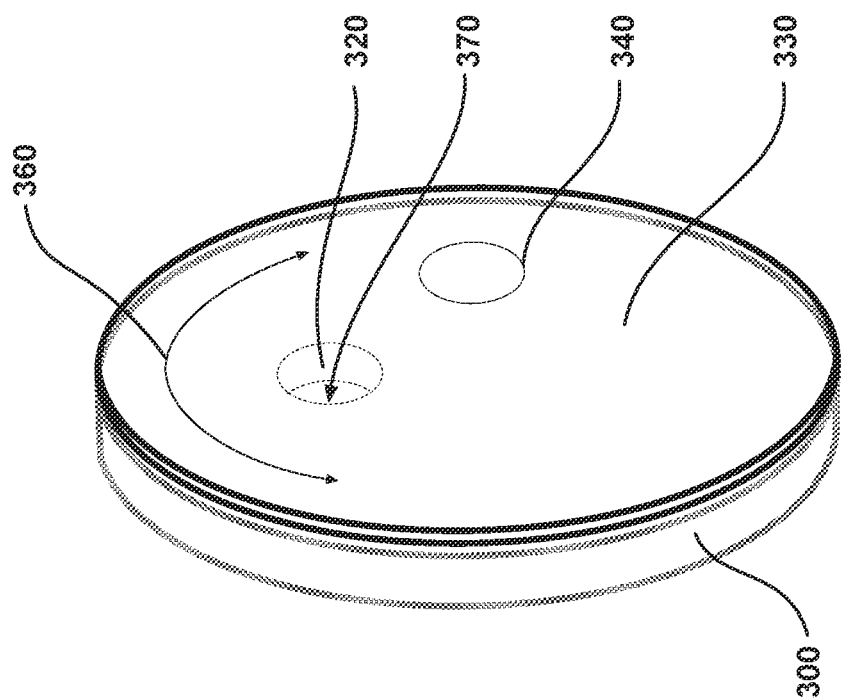
FIGS. 8A and 8B are schematic illustrations of a rotatable plate for a variable area air inlet according to another illustrative embodiment.
Figure 8A:
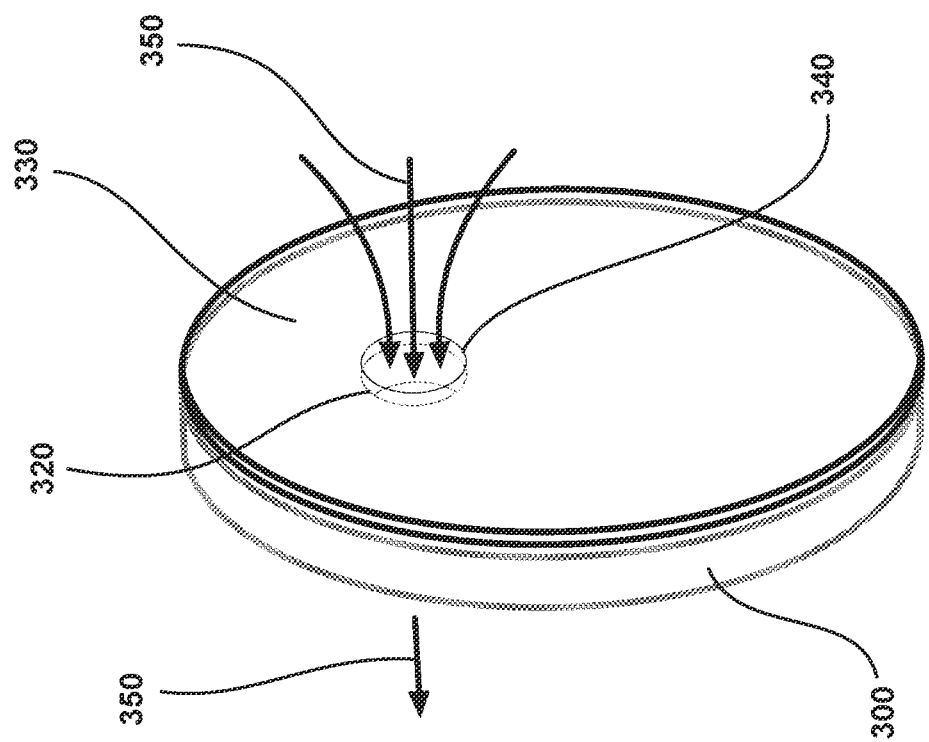
Figure 10:
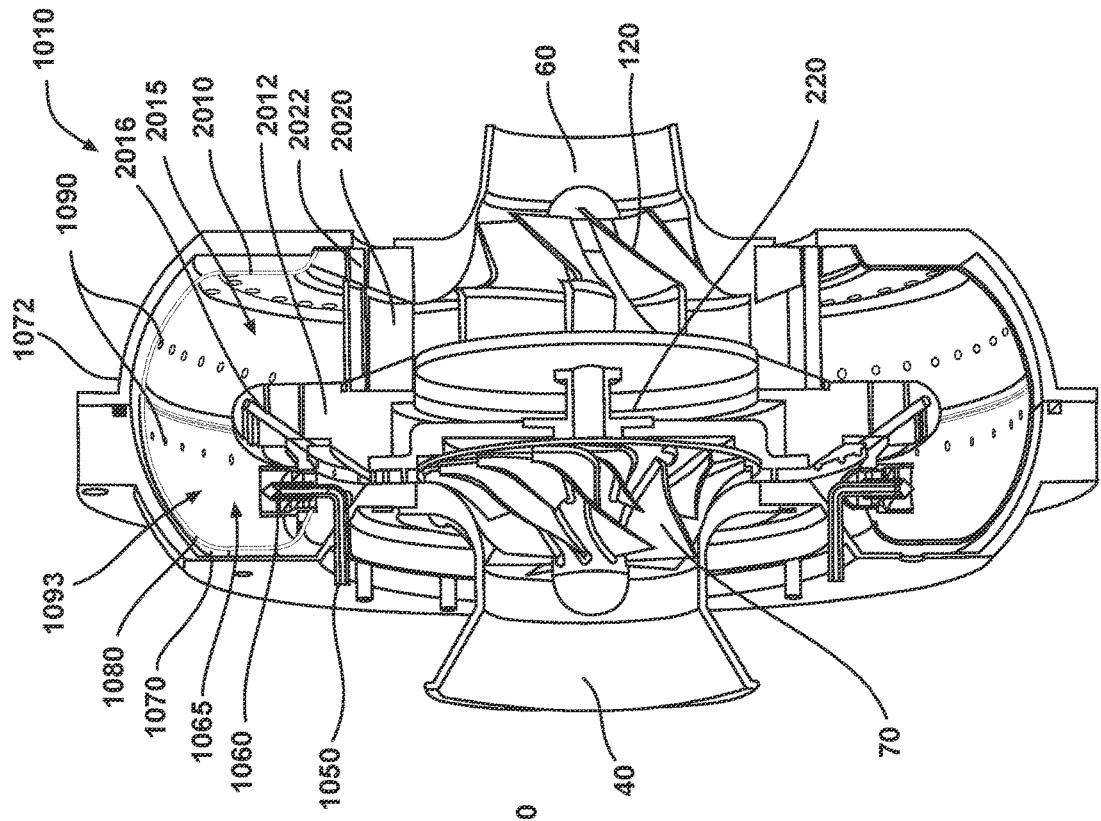
FIG. 10 is a cut-away sectional view of the disk engine of FIG. 9.
Figure 9:
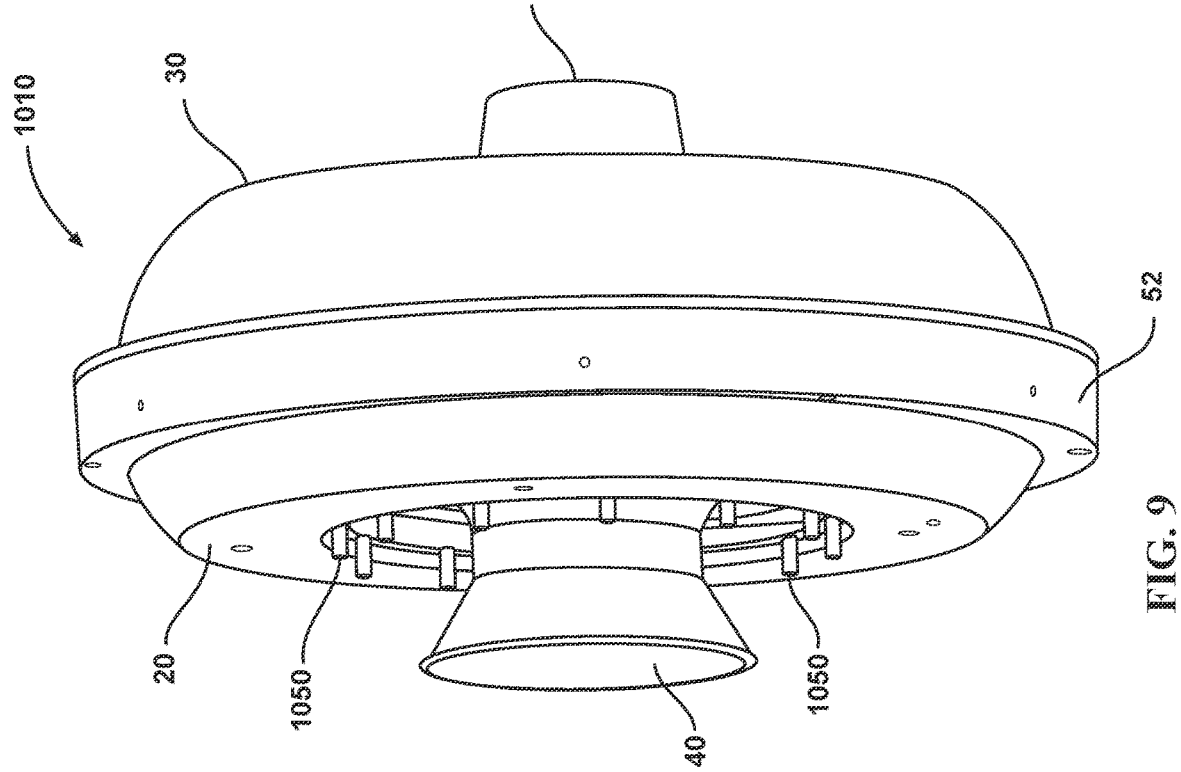
FIG. 9 is a perspective view of a disk engine according another embodiment of the present disclosure.

Referring to FIGS. 8A and 8B, a schematic illustration of a rotatable plate for use as a variable area air inlet device according to another illustrative embodiment is shown. A combustor wall 300 for a combustion chamber can include a variable aperture 320 to permit compressed air to flow therethrough. A rotatable plate 330 includes a control aperture 340 that when aligned with the aperture 320 of the combustor wall 300, airflow 350 can pass through both apertures 320 and 340 without impedance or restriction. The rotatable plate 330 can be rotated as illustrated by double arrow 360, such that the aperture 320 can be partially or completely closed. FIG. 8A shows the variable inlet 320 completely open with unrestricted flow represented by arrows 350. FIG. 8B shows the variable aperture 320 completely closed as the control aperture 340 is rotated away from the variable aperture resulting in the flow 370 being prevented from passing through the aperture 320.

Referring now to FIGS. 9-13, an alternate embodiment of a disk engine 1010 is illustrated in the various views. Many of the features of the disk engine 1010 may be the same or similar to the disk engine 10 and, therefore will not be described again. With specific reference to FIGS. 9-11, the disk engine 1010 includes a plurality of fuel injection inlet ports or fuel injectors 1050 engaged through the compressor side wall 20 around the radial compressor 70. Each fuel injector 1050 extends through a corresponding air swirler 1060 that is operable to generate additional turbulence into the compressed air discharged from the radial compressor 70. The swirlers 1060 facilitate mixing of the fuel and air so that the reactants can combust quickly in a circumferential combustor 1065. A combustion liner 1070 is ~9~ positioned within a circumferential manifold 1072 such that a combustion liner passageway 1080 is formed therebetween to transport compressor discharge air therethrough. The combustor or combustion chamber 1072 is located radially inward of the combustion liner 1070.

A plurality of secondary air injection apertures 1090 are formed in an outer perimeter wall of the combustion liner 1070. Air can be directed from the combustion liner passageway 1080 through the secondary air injection apertures 1090 and into a primary combustion zone 1093 and a secondary combustion zone 2015 of the combustor 1065. A plurality of dilution cooling holes 2010 are formed in sidewalls of the combustion liner 1070. The dilution cooling holes 2010 transport cooling air from the combustion liner passageway 1080 into the secondary zone 2015 of the combustor 1065. The air passing through the dilution cooling holes 2010 can be used to cool certain portions of the disk engine 1010 and provide addition air to support complete lean combustion of any remaining unburned reactants.

A centerbody 2012 extends into the combustor 1065 and includes a plurality of cooling pathways 2016 that receive and transport compressor discharge air to cool various components internal to the disk engine 1010. A turbine stator 2020 includes a stator cooling passageway 2022 formed therein that is in fluid communication with one or more of the cooling pathways 2016 of the centerbody 2012.

Figure 11:
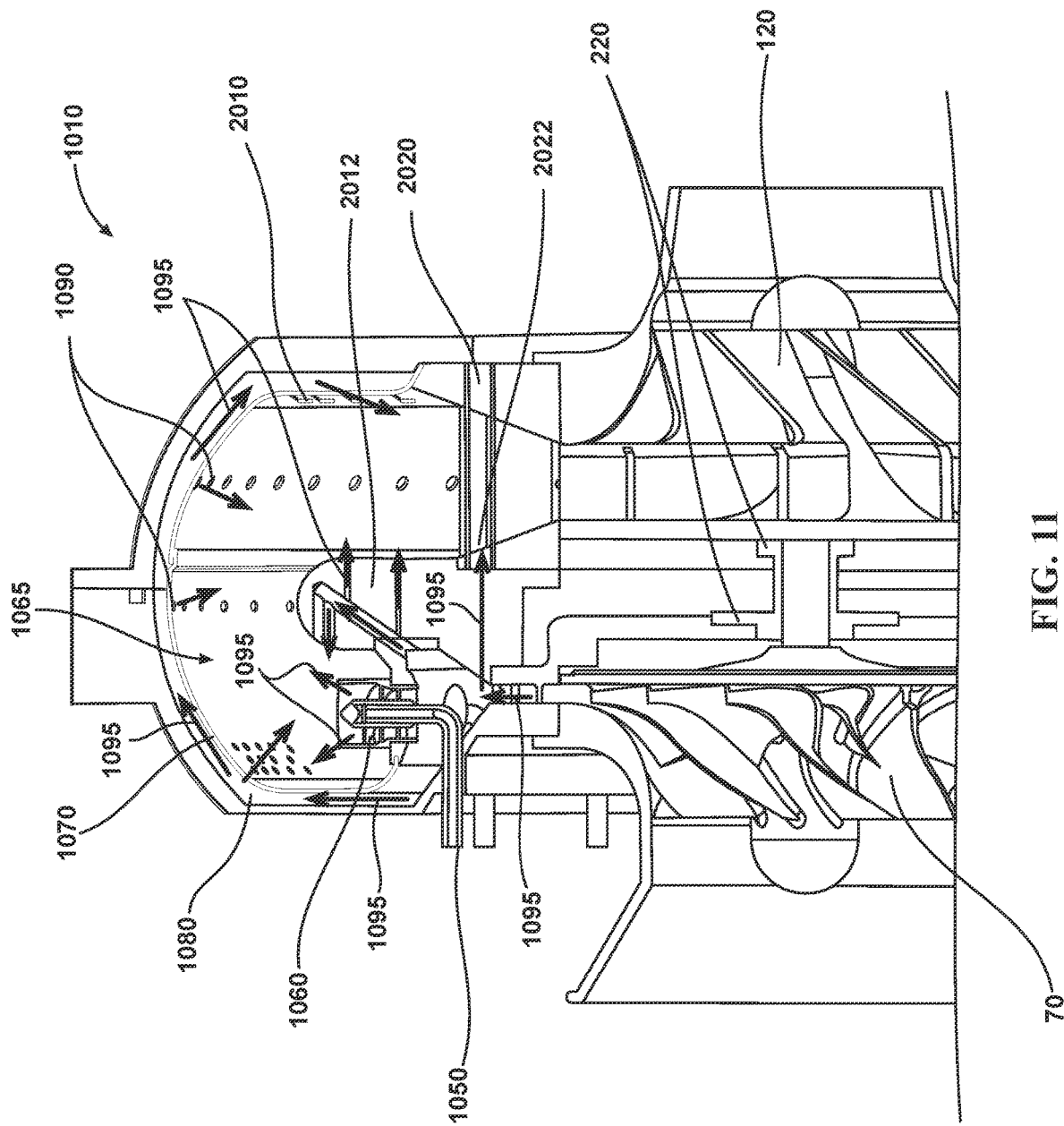
FIG. 11 is an enlarged view of a portion of FIG. 10 with arrows showing internal fluid flow paths.

Referring more particularly to FIG. 11, the compressor discharge flow paths are illustrated with arrows 1095. A substantial majority of the compressor discharge flows through the plurality of swirlers 1060 where fuel is injected through the fuel injection ports 1050 to provide a combustion mixture with a desired air/fuel ratio to the combustor 1065. A portion of the compressor discharge flow is diverted through the combustion liner passageway 1080 and other cooling passageways as described in FIG. 10.

Figure 12:
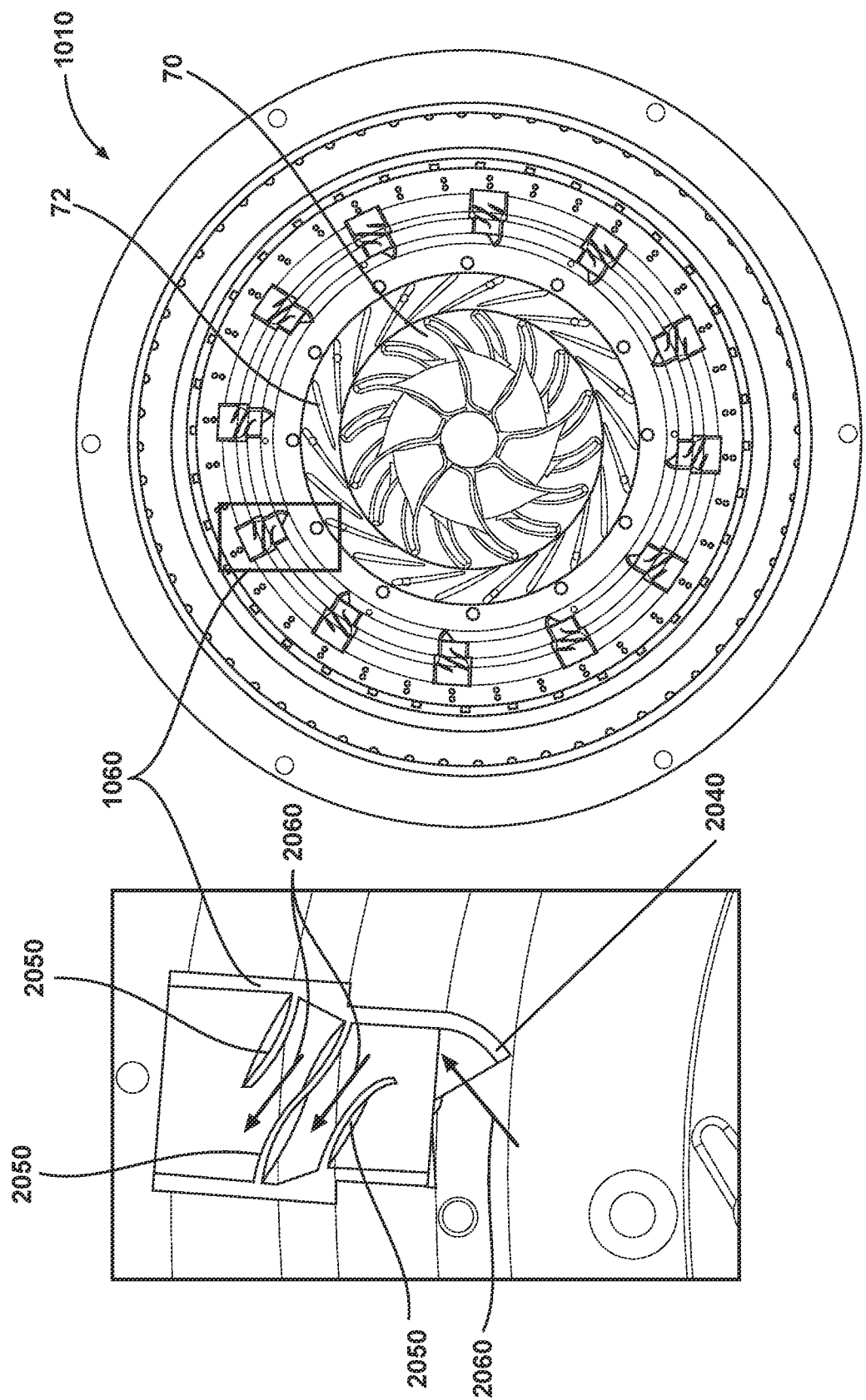
FIG. 12 is a side cut-away sectional view of the compressor side of the disk engine of FIG. 9.

Referring now to FIG. 12, a compressor side cutaway view of the disk engine 1010 is illustrated with an enlarged view of a swirler 1060. A plurality of swirlers 1060 are positioned around the compressor 70 radially outward of the compressor outlet stator vanes 72. Each swirler 1060 includes an angled inlet scoop 2040 that is proportional to the angle of the compressor outlet vanes 72. The scoop angle may vary, but in one form can be approximately 45 degrees relative to a radial centerline. The swirler 1060 includes a plurality of swirler vanes 2050 configured to generate turbulence and direct the compressor discharge flow through a swirling flow path represented by arrows 2060.

Figure 13:
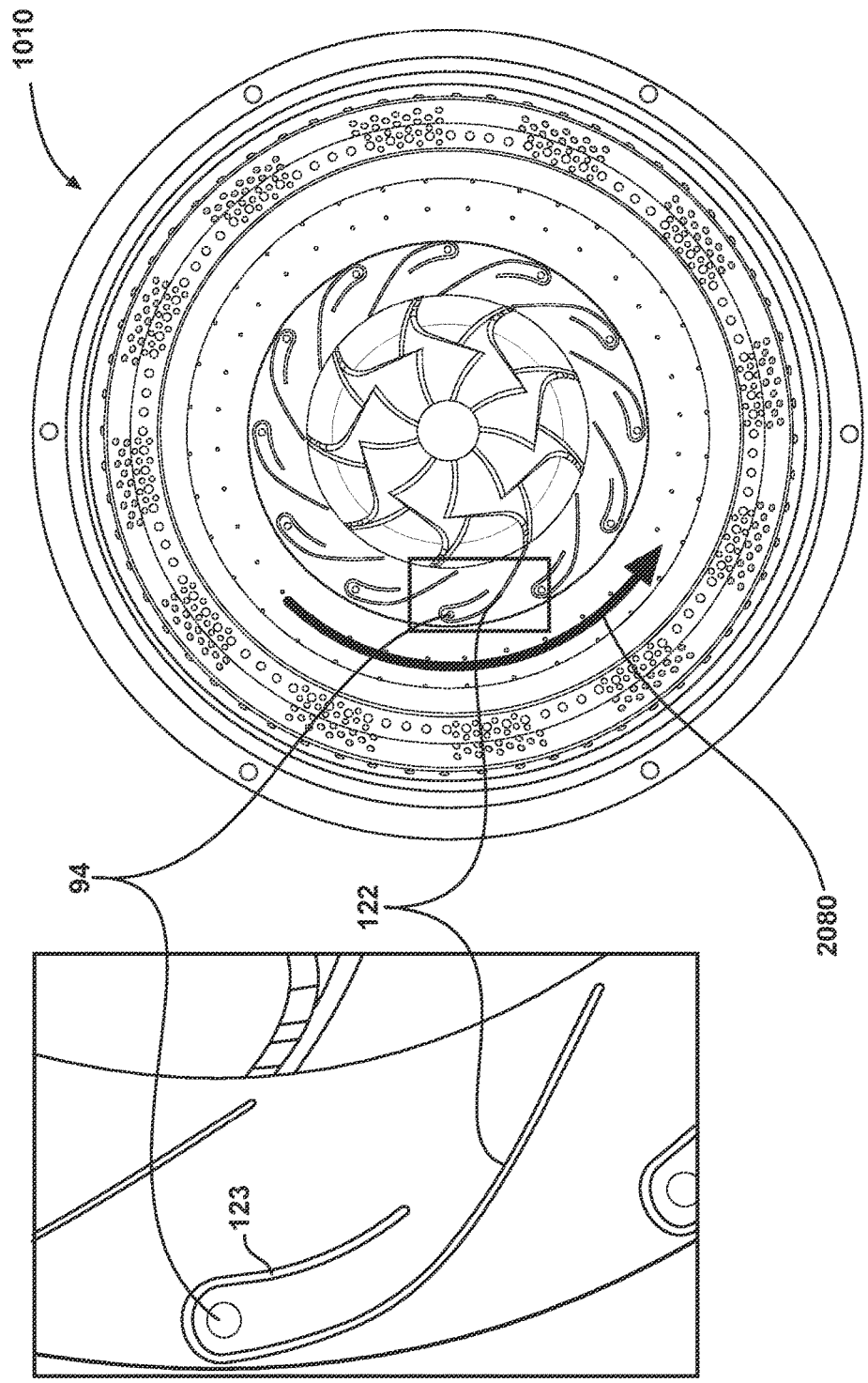
FIG. 13 is a side cut-away sectional view of the turbine side of the disk engine of FIG. 9.

Referring now to FIG. 13, a turbine side cutaway view of the disk engine 1010 is illustrated with an enlarged view of a turbine inlet guide vane 122. The turbine inlet guide vane 122 includes an upper hook portion 123 wrapped around a stator coolant hole 94. The turbine rotates in the direction of arrow 2080 and rotationally drives the compressor as is well understood.

In one aspect, the present disclosure includes a disk engine comprising: a radial compressor; a compressor discharge manifold positioned circumferentially around the compressor; a combustion chamber positioned within the discharge manifold; and a radial turbine positioned radially inward of the combustion chamber.

In refining aspects the present disclosure includes a plurality of fuel inlet ports positioned through an outer perimeter wall of the discharge manifold; wherein the combustion chamber includes a primary combustion zone in a radially outer region; wherein the combustion chamber includes a secondary combustion zone radially inward of the primary combustion zone; wherein the combustion chamber includes a dilution combustion zone radially inward of the secondary combustion zone; a plurality of offset air inlet holes positioned on opposing sides of the combustion chamber; wherein opposing pairs of the plurality of offset air inlet holes are angled relative to one another; wherein the air inlet holes are positioned proximate a primary combustion zone, a secondary combustion zone and a dilution zone of the combustion chamber; a variable geometry inlet flow control device in fluid communication with one or more of the air inlet holes; wherein the variable geometry inlet flow control device includes a sliding plate operable to selectively block a flow aperture; wherein the sliding plate is movable between fully open position and a closed position; and wherein the variable geometry inlet flow control device includes a rotating plate with one or more through apertures configured to rotate and selectively block a portion of one or more of the air inlet holes.

In another aspect, the present disclosure includes a disk engine comprising: a radial compressor enclosed by a compressor sidewall; a compressor discharge manifold positioned circumferentially around the compressor; a combustion chamber positioned within the discharge manifold; a radial turbine positioned radially inward of the combustion chamber; and a plurality of fuel injectors extending through the compressor sidewall around a compressor discharge region of the radial compressor.

In refining aspects the present disclosure includes a plurality of air swirler devices positioned downstream of the radial compressor; wherein each fuel injector extends through one of the air swirler devices; a combustion liner formed within the discharge manifold; a combustion liner cooling passageway formed between the combustion liner and the discharge manifold; a plurality of cooling air holes formed through the combustion liner, a center body having a plurality of cooling passageways extending into the discharge manifold and a turbine stator having a cooling passageway in fluid communication with at least one of the cooling passageways in the center body.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A disk engine comprising:
   a radial compressor;
   a compressor discharge manifold positioned circumferentially around the radial compressor;
   a disk shaped combustion chamber having a first sidewall and a second sidewall extending in a radial direction and spaced in an axial direction with an outer circumferential wall connected therebetween;
   a radial turbine positioned radially inward of all portions of the combustion chamber;
   wherein airflow enters the radial compressor in the axial direction, compressed air is directed radially outward into the compressor discharge manifold and passes axially through a plurality of air inlet holes formed in each of the first sidewall and the second sidewall of the disk shaped combustion chamber and wherein combustion gases are directed radially inward from the disk shaped combustion chamber to drive the radial turbine; and
   a plurality of fuel inlet ports positioned through an outer perimeter wall of the compressor discharge manifold.

2. The disk engine of claim 1, wherein the disk shaped combustion chamber includes a primary combustion zone in a radially outer region.

3. The disk engine of claim 2, wherein the disk shaped combustion chamber includes a secondary combustion zone radially inward of the primary combustion zone.

4. The disk engine of claim 3, wherein the disk shaped combustion chamber includes a dilution combustion zone radially inward of the secondary combustion zone.

5. The disk engine of claim 1, wherein the air inlet holes are offset at different radial locations in the first sidewall relative to the second sidewall of the disk shaped combustion chamber.

6. The disk engine of claim 5, wherein the offset air inlet holes are angled relative to one another.

7. The disk engine of claim 5, wherein the air inlet holes are positioned proximate a primary combustion zone, a secondary combustion zone and a dilution zone of the disk shaped combustion chamber.

8. The disk engine of claim 5, further comprising a variable geometry inlet flow control device in fluid communication with one or more of the air inlet holes.

9. The disk engine of claim 8, wherein the variable geometry inlet flow control device includes a sliding plate operable to selectively block a flow aperture.

10. The disk engine of claim 9, wherein the sliding plate is movable between a fully open position and a closed position.

11. The disk engine of claim 8, wherein the variable geometry inlet flow control device includes a rotating plate with one or more through apertures configured to rotate and selectively block a portion of one or more of the air inlet holes.

* * * * *